United States Patent
Brown et al.

(10) Patent No.: US 9,404,618 B2
(45) Date of Patent: Aug. 2, 2016

(54) LIFTING EXTENSION MOUNT ASSEMBLY FOR EQUIPOISING ARMS

(71) Applicant: Garrett W. Brown, Philadelphia, PA (US)

(72) Inventors: Garrett W. Brown, Philadelphia, PA (US); Jerry Holway, Exton, PA (US)

(73) Assignee: Garrett W. Brown, Philadelphia, PA (US)

( * ) Notice: Subject to any disclaimer, the term of this patent is extended or adjusted under 35 U.S.C. 154(b) by 104 days.

(21) Appl. No.: 14/388,257

(22) PCT Filed: Apr. 12, 2013

(86) PCT No.: PCT/US2013/036360
§ 371 (c)(1),
(2) Date: Sep. 26, 2014

(87) PCT Pub. No.: WO2013/158490
PCT Pub. Date: Oct. 24, 2013

(65) Prior Publication Data
US 2015/0076196 A1    Mar. 19, 2015

Related U.S. Application Data

(60) Provisional application No. 61/624,340, filed on Apr. 15, 2012.

(51) Int. Cl.
*F16M 13/04*    (2006.01)
*F16M 11/20*    (2006.01)
*F16M 11/24*    (2006.01)
*G03B 17/56*    (2006.01)

(52) U.S. Cl.
CPC ........... *F16M 13/04* (2013.01); *F16M 11/2014* (2013.01); *F16M 11/2092* (2013.01); *F16M 11/24* (2013.01); *G03B 17/561* (2013.01); *F16M 2200/044* (2013.01); *F16M 2200/045* (2013.01); *F16M 2200/063* (2013.01); *Y10S 224/908* (2013.01)

(58) Field of Classification Search
CPC .......................... F16M 13/04; Y10S 224/908
USPC .................. 396/420, 421, 428; 248/585, 586; 352/243
See application file for complete search history.

(56) References Cited

U.S. PATENT DOCUMENTS

| | | | |
|---|---|---|---|
| 4,091,975 A * | 5/1978 | Russell, Jr. ............ | F16M 13/04 224/265 |
| 4,156,512 A | 5/1979 | Brown | |
| 4,208,028 A * | 6/1980 | Brown .................. | F16M 13/04 224/185 |
| 4,394,075 A | 7/1983 | Brown | |
| 4,460,148 A * | 7/1984 | Sasaki .................. | B66C 23/005 248/585 |

(Continued)

OTHER PUBLICATIONS

International Search Report and Written Opinion for PCT/US2013/036360, issued Jul. 22, 2013.

*Primary Examiner* — Justin Larson
(74) *Attorney, Agent, or Firm* — Barnes & Thornburg LLP; Joan T. Kluger

(57) ABSTRACT

A lifting extension mount assembly for attaching an equipoising arm to an object. The lifting extension mount assembly has an extension mount component rigidly fixed to an object. A lifting segment is attached to the extension mount component. The lifting segment is pivotable with respect to the extension mount component at the attachment point in a vertical plane only. An angle-adjustment assembly is including.

13 Claims, 20 Drawing Sheets

(56) References Cited

U.S. PATENT DOCUMENTS

| | | | | |
|---|---|---|---|---|
| 4,678,155 A * | 7/1987 | Carter | ............... | B60N 2/502 248/564 |
| 4,976,387 A * | 12/1990 | Spianti | ............... | F16M 13/04 224/262 |
| 5,360,196 A | 11/1994 | DiGiulio | | |
| 5,435,515 A * | 7/1995 | DiGiulio | ............... | F16M 11/04 224/908 |
| 7,562,851 B2 * | 7/2009 | Hein | ............... | F16M 11/04 248/276.1 |
| 7,618,016 B2 * | 11/2009 | Brown | ............... | F16F 1/12 224/185 |
| 8,066,251 B2 * | 11/2011 | Brown | ............... | F16F 1/12 224/185 |
| 8,142,083 B2 | 3/2012 | Brown | | |
| 8,506,180 B2 * | 8/2013 | Brown | ............... | F16M 13/04 248/187.1 |
| 8,801,319 B2 * | 8/2014 | Brown | ............... | F16M 11/04 403/145 |
| 9,204,730 B2 * | 12/2015 | Brown | ............... | A47C 1/03 |
| 2006/0258495 A1 | 11/2006 | Hein et al. | | |
| 2010/0059652 A1 * | 3/2010 | Brown | ............... | F16F 1/12 248/585 |
| 2010/0065705 A1 * | 3/2010 | Brown | ............... | F16M 11/04 248/288.11 |
| 2014/0366323 A1 * | 12/2014 | Brown | ............... | F16M 11/04 16/322 |
| 2015/0001269 A1 * | 1/2015 | Sacksteder | ............... | F16M 13/04 224/576 |
| 2015/0076196 A1 * | 3/2015 | Brown | ............... | F16M 11/2014 224/271 |

* cited by examiner

LIFTING EXTENSION MOUNT ASSEMBLY FOR EQUIPOISING ARMS

BACKGROUND OF THE INVENTION

Equipoising or lifting arms have supported equipment, such as Steadicam® brand stabilized camera systems, since 1975. These arms typically consist of two serial parallelogram linkages (segments) connected by a central hinge, with each linkage generating a lifting force created by a resilient means. The proximal hinges of these arms, i.e. the hinges closest to the operator on each segment, are typically hinged to a robust load-supporting vest, worn by the operator, and ideally support virtually all of the weight of the payload camera stabilizer (or industrial tool), and permit low friction, finger-tip manipulation thereof—as if in zero gravity—within the volume of space defined by their lifting and extending range. Unfortunately, to date, this volume is considerably less than the volume of space accessible to the average human arm.

As used herein an "equipoising arm" is not limited to a lifting arm that has a uniform lifting force throughout its excursion, although such an arm is within the definition.

Camera stabilizers, such as 'Steadicam®' devices in so-called 'high-mode' (camera mounted on top), typically deliver a range of lens heights from approximately waist to head; or alternately from knees to waist height in so-called 'low-mode' (camera hanging below). The operator must stop work and the equipment must be physically altered to switch from high-mode to low-mode shooting. If the lifting range of the camera stabilizer arms could more closely match the gripping range of the average human arm, the switch from high to low-mode operating would likely be needed much less often, since the lens, in low mode for instance, could go continuously from knee level to above head height.

Attempts have been made to add a third lifting segment to these equipoising arms in order to augment their lifting range, but the results have been unsatisfactory. Conventional equipoising arm segments are hinged to swing laterally, starting from the proximal hinge at the vest. These hinges present functional difficulties when a third lifting arm segment is added. All three segments, each weighing several pounds, can swing capriciously, since they now form three sides of a horizontal four-bar linkage, which is unrestrained and often haphazardly obstructive to normal operating.

An additional problem occurs when three-segment arms are mounted to a vest, in particular to the back of the vest, behind the operator. Non-vertical orientation of the proximal hinge causes the payload to side-slip laterally and requires proportional restraint. An arm-angle adjusting mechanism is located between the support structure at the vest and the proximal hinge to address the problem. These arm-angle adjusting mechanisms are frequently fine-tuned on-the-fly for various operating conditions and maneuvers, so it can be desirable to have them within reach of the operator. If a three-segment arm were to be mounted behind the operator, these adjustments would typically be unreachable by hand.

Additionally, past attempts to incorporate a third lifting segment often caused the added third segment to move uncontrollably in a vertical plane—locking up or down as the torque of the next section capriciously powers or de-powers the previous one.

What is needed is a way to increase the lifting range of an equipoising arm to more closely match the human 'gripping range' while minimizing degradation of functionality or performance.

What is needed is also a way to add a third lifting segment to an equipoising arm and still be able to adjust the arm's angular attitude on-the-fly, relative to the support structure of the vest.

Further needed is a way to provide a back-mounted, lifting segment for an equipoising arm, that does not require the entire assembly to be hinged for lateral movement at the mounting point and that allows arm-angle adjustments to be made within relatively easy reach.

Also, what is needed is a means to adjust the horizontal location of such a lifting segment for operators of varying girth; and also to switch it to either side of an operator for right-side vs. left-side operation.

SUMMARY OF THE INVENTION

Embodiments of the invention include a lifting extension mount assembly for attachment of a lifting arm for supporting a payload such as a tool or camera. The extension mount assembly is not laterally hinged at its attachment point to a user's vest or other object, and thus, does not swing laterally therefrom. This configuration is referred to herein as being "laterally-fixed." Instead it is rigidly fixed to an operator's support vest or other object and so provides a forwardly offset mount that is preferably immobile in all axes other than vertical to substantially vertical. Although "rigidly" fixed, the extension mount component may be removable and also adjustable. It typically remains in a fixed position though during use.

A lifting segment, usually in the form of a parallelogram with a resilient component to provide a lifting force, is attached to an extension mount component, which may be in the general form of a plate for example. The lifting segment of the extension mount assembly in effect adds the excursion of an additional section to the lifting range of conventional, equipoising arms such as a two-section, lifting arm.

In an illustrative embodiment of the invention, the lifting extension mount assembly comprises an extension mount component having a proximate end and a distal end and configured to be rigidly fixed to an object at the extension mount component proximate end. A lifting segment is provided having a proximate end and a distal end. The lifting segment is attached at its proximate end to the distal end of the extension mount component. The lifting segment is pivotable with respect to the extension mount component at the attachment location in a vertical plane only. The lifting extension mount assembly is attachable at its distal end to a two-segment lifting arm.

Preferably included in the extension mount assembly is an angle-adjustment assembly to maintain a substantially vertical lifting segment proximate and distal parallelogram sides in a substantially vertical position by adjusting their angular relation to an operator's preferred posture. The arm-angle adjusting assembly is preferably in reach of the operator. The arm-angle adjustment assembly adjusts the angular relationship between the user and the lifting arm based on the s user's preferred posture so that the proximal hinge axle, at the attachment of the equipoising arm to the extension mount assembly lifting segment, and the central hinge axle, disposed between the two-segments of the equipoising arm, are substantially parallel to the vector of gravity when the operator is standing comfortably. This will typically minimize tiny side-slip of the arm and payload. In an illustrative embodiment of the invention the angle adjustment assembly comprises a two-axis adjusting mechanism with orthogonally converging axles on which pivot rocker blocks. A first rocker block is pivotable about a first axis and a second rocker block is pivotable about a second axis perpendicular to the first axis. First rocker block screws are disposed through the first rocker block and can be used to adjust the first rocker block about the first axis. Second rocker block screws are disposed through the second rocker block to adjust the second rocker block about the second axis. The second rocker block screws can be engagable with screw keeper notches in the first rocker block.

The angle-adjustment assembly may be disposed between the lifting segment and the extension mount component, which may be suitable for an extension mount assembly attached to an object in back of a user. The angle-adjustment assembly may be disposed at the proximate end of the extension mount component, which can be suitable for example, for an extension mount assembly attached to an object in front of a user.

The extension mount component can be adjustable in a substantially horizontal plane to accommodate operators of various girths. The extension mount assembly can be configured to be attached to an object behind an operator or in front of an operator, and various positions in between. The lateral angles between the extension mount components and the lifting segment can be selected to coordinate with the position of the assembly with respect to the user. The extension mount assembly may be configured to be attached to a back portion of a vest or the front portion for example.

In a particular embodiment of the invention, the lifting mount assembly comprises an inversion of the lifting mechanism, such as is disclosed in U.S. Pat. No. 8,066,251, the portions describing the lilting mechanism incorporated herein by reference, which provide both preset and dynamic control of the degree of 'iso-elasticity' (uniformity of lifting force). In this embodiment, the proximal parallelogram segment is flipped end to end and inverted, so it lifts as before, but the controls for 'lift' (amount of lifting power) and 'Ride' (lifting contour) are accessibly underneath at the distal end rather than conventionally above at the proximal end, which would have rendered them unreachable at the operators back.

A torsion spring may be disposed between the arm-angle adjustment assembly and a lifting segment of the two-segment lifting arm to bias the equipoising arm about an axis disposed substantially perpendicular to the lifting axis of the two-segment lifting arm.

In the motion-picture and TV industries, 'soft-mounting' refers to a camera stabilizer mounted to a human-worn support vest as disclosed. Another illustrative embodiment of the invention includes a means for 'hard-mounting' lifting extension to a fixed or mobile platform. Hard-mounting the extended arm may also permits it to be operated closer to the center of its total lifting range.

The invention further includes a method of supporting a payload by providing an extension mount assembly, attaching it to an object at one end and to an equipoising arm at the other end.

DESCRIPTION OF THE DRAWINGS

For further detail regarding illustrative embodiments of the invention, reference is made to the detailed description found below in conjunction with the following illustrations.

DETAILED DESCRIPTION OF THE INVENTION

Figure 1:
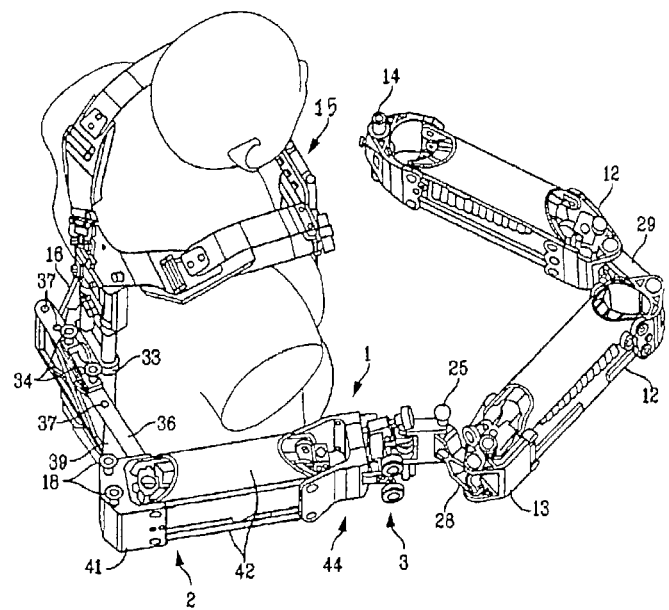
FIG. 1 is an isometric view of a lifting extension mount according to an illustrative embodiment of the invention, connecting an operator's vest to an equipoising arm.

FIG. 1 is an isometric view of an illustrative embodiment of a laterally-fixed lifting extension mount 1 according to an illustrative embodiment of the invention. Operator's load-bearing vest assembly 15 is rigidly connected via back-mounting structure 16 and mounting clamp 33 to primary extension mounting component 36. To accommodate operators of varying girth, extension mount component 36 can be adjustably extended laterally by means of pins 34 extending through clamp 33 to selected holes 37. To accommodate right-side vs. left-side operating, extension mount component 36, together with connected end-block mount 39, can be inverted to extend laterally to either side of clamp 33. Mount 39 can then be rigidly attached (in either left or right orientation) by pins 18 to end-block component 41 of lifting mount parallelogram lifting segment 2. End-block 41 connects parallelogram links 42 to forward end-block 44. Arm 2 contains resilient components to create lifting forces that can be adjusted by conventional 'ride' and 'lift' controls. The controls are not visible in FIG. 1 because parallelogram lifting segment 2 is inverted and flipped end-to-end compared to the typical prior art practice, in order for the controls to remain accessible to the operator when in use. The prior art position of these controls as shown here in conventional arm 12 was at the top of the proximal ends of the two parallelogram lifting segments (as can be seen protruding from the top of end-block 13).

End-block 44 is connected to arm-angle adjustment assembly 3, which connects via arm-mounting pin 25 and primary hinge 28 to equipoising arm 12. Arm 12 (shown grayed-out), consists typically of two resiliently powered parallelogram sections connected to one another by central hinge 29 and terminating with arm load-bearing post 14. Camera stabilizer or other payloads such as an industrial tool (not shown) can be mounted to post 14.

In an illustrative embodiment of the invention, all lifting extension mount components, up to and including angle adjustment assembly 3, are 'laterally fixed'—meaning they do not swivel in the horizontal plane or a plane other than that in which lifting occurs—and thus provide a functional mount for equipoising arm 12. The lifting extension mount of the invention is spatially vertically agile, thus augmenting the lifting range of arm 12 while potentially minimizing lateral and vertical motions that occur when a three-section arm swivels at its primary vest connection—as do all known prior-art, human-borne, equipoising arms. The result is that operators are able to 'boom' (elevate or depress vertically) their payloads throughout a lifting range that may be approximately 50% greater than conventional assemblies, and yet maintain control over the disposition of the various arm segments. Additionally, they can accessibly adjust the attitude of the arm relative to their preferred posture, so that the arm lifts 'up' and does not require, or minimizes, energetic restraint in the horizontal plane.

Figure 2:
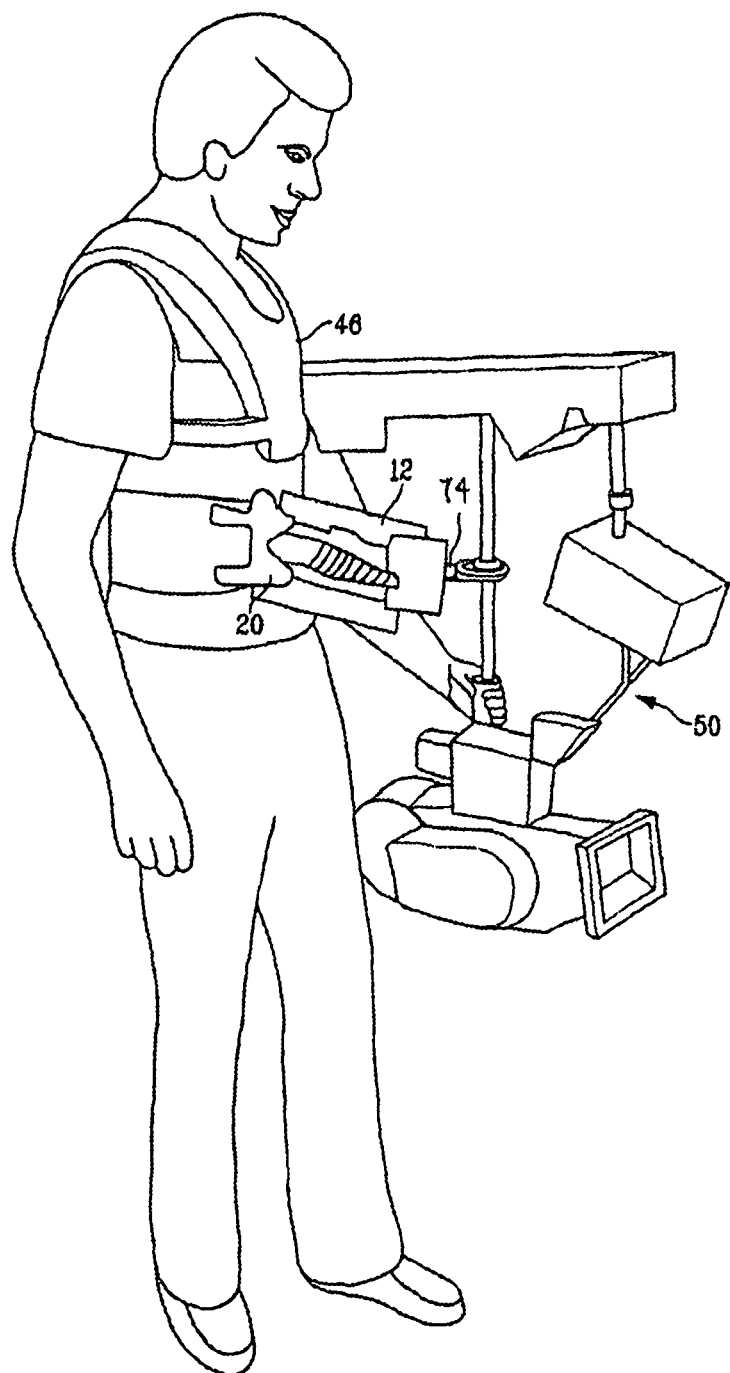
FIG. 2 shows an operator wearing a prior art vest with a prior art equipoising arm attached thereto.
Figure 4:
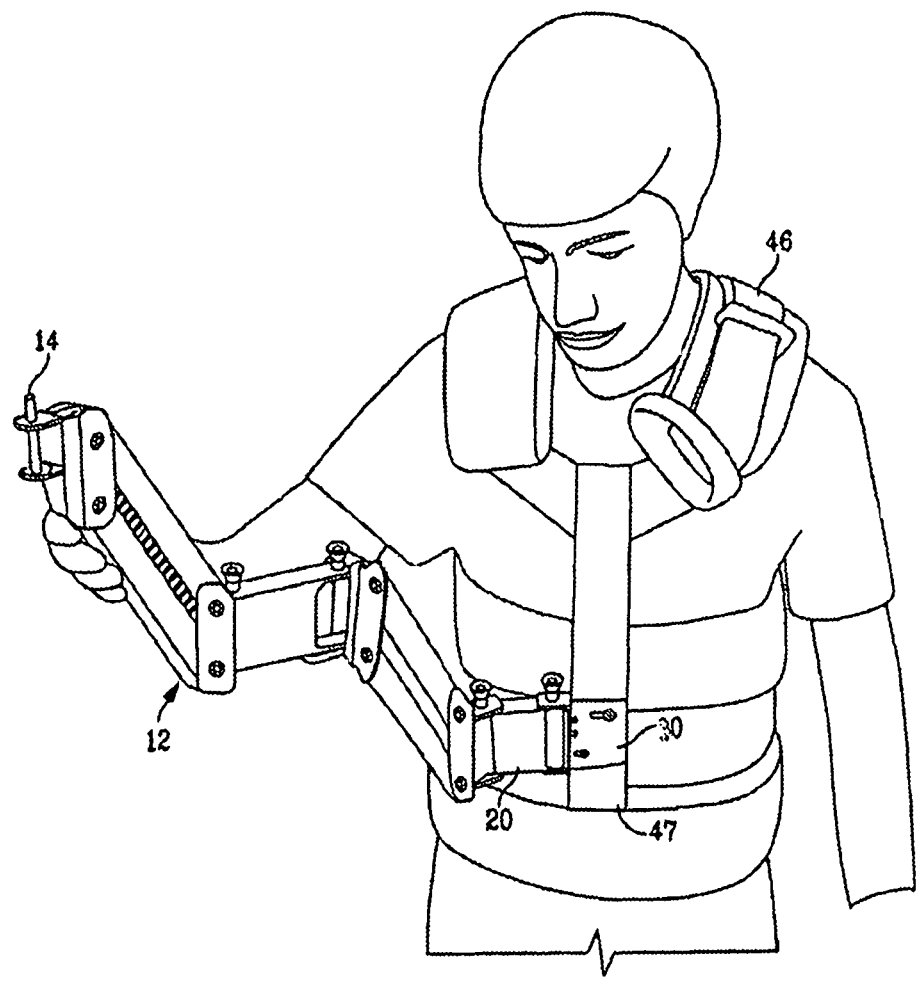
FIG. 4 depicts a prior an equipoising arm attached to the front portion of a vest.

FIGS. 2 and 4 show an operator employing a prior art Steadicam®-type camera stabilizer apparatus, including load-bearing vest assembly 46, which includes vest front-mounting structure 47 attached to arm-mounting bridge plate 30 (shown in FIG. 4) and then to a conventional arm-angle adjuster assembly 20. Adjuster 20 is further attached to an equipoising arm 12, arm load-bearing post 74, and finally to payload 50. When the operator is standing comfortably, adjuster 20 can be exercised in two axes so that the hinge pins of arm 12 are substantially vertical. This prevents arm 12 and payload 50 from side-slipping and requiring restraint by the operator. Payload 50 can only be raised, or 'boomed up' to the extent of the excursion range of arm 12.

Figure 3:
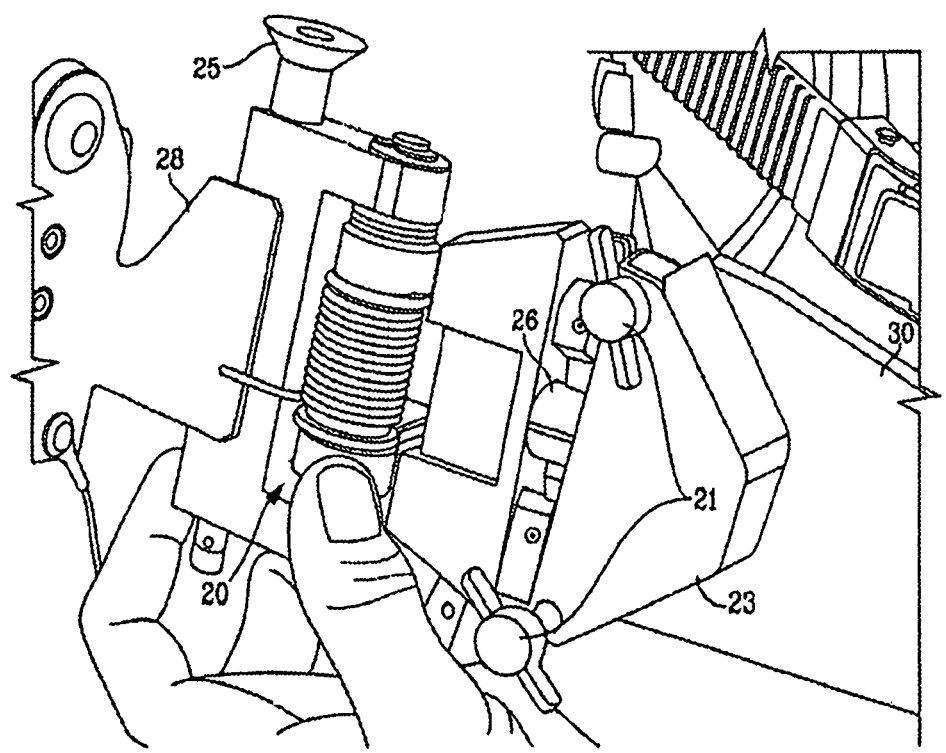
FIG. 3 is a close-up view of prior art arm mounting hardware connecting the operator vest of FIG. 2, via an intervening arm-angle adjuster, to a proximal arm hinge.

FIG. 3 is a close-up view of conventional prior-art arm mounting hardware shown connecting an operator vest such as shown in FIG. 2, via an intervening arm-angle adjuster 20 to a proximal arm hinge 28. Arm mounting stud 26 is shown being inserted into receptacle socket 23, and once installed can be set to the desired angle around the axis of pin 26, by tightening fore/aft arm-angle adjusting rocker screws 21. Side/side arm angle adjusting ball-rod-end screws are then set to determine the side to side angle of the arm relative to bridge-plate 30 attached to a vest (not shown). Because the arm (not shown) swivels around its several vertical hinge pins, starting with those in proximal hinge 28, these adjustments are necessary so the operator can stand comfortably upright and not have to restrain the arm from side-slipping because the hinges are not likewise vertical.

FIG. 4 depicts a prior art equipoising arm attached to the front of an operator's vest. An arm can also be mounted in the back of an operator. Typically the arm is attached to a rigid mount bridge-plate assembly.

Figure 5:
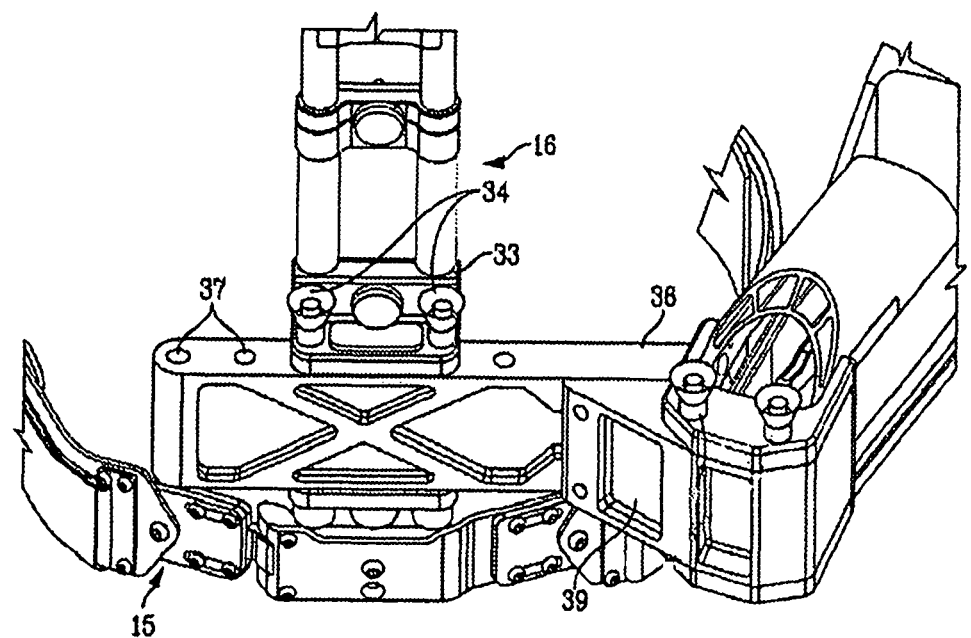
FIG. 5 is a back view of a lifting extension mount assembly according to an illustrative embodiment of the invention, showing its connection to an operator's vest and its literally rigid connection to the lifting segment.

FIG. 5 is a back view of a lifting extension mount according to an illustrative embodiment of the invention. It shows vest 15 and vest back-mounting structure 16, engaged by clamp 33 and mounted via pins 34 to primary rigid extension mounting component 36. In order to accommodate operators of varying girths, extension mount component 36 can be repositioned laterally by means of pins 34 and holes 37. Non-swiveling end block mount 39 is rigidly attached to end block 13 and thus forms a laterally rigid connection to the lifting extension for an equipoising arm (not shown). Extension mount component 36 and attached non-swiveling mount 39 can be inverted to remount end block 13 on the left side, as opposed to the right side as shown. This permits 'other-handed' operators to deploy the lifting extension on the opposite side.

Figure 6A:
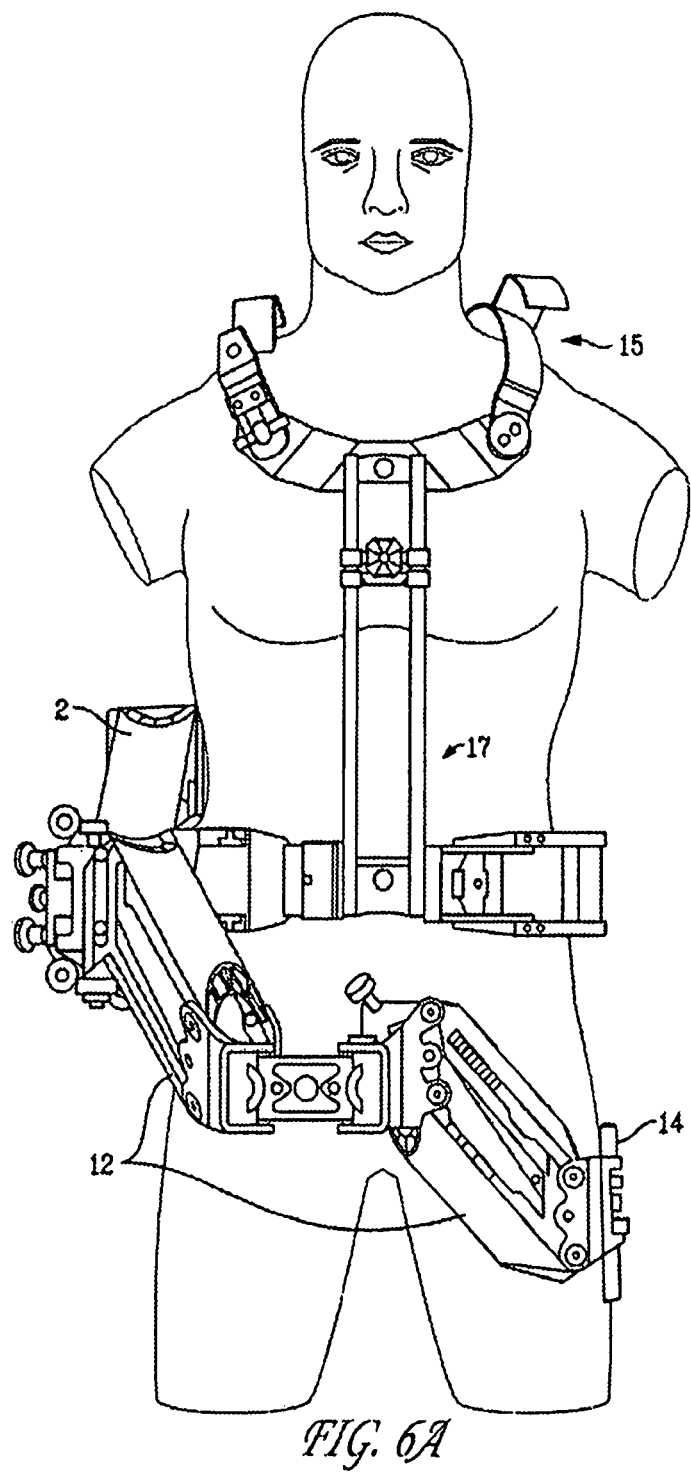
FIGS. 6A-B show two illustrative front views of a lifting extension mount and attached two-section equipoising arm, illustrating maximum low and high excursions according to an illustrative embodiment of the invention.
Figure 6B:
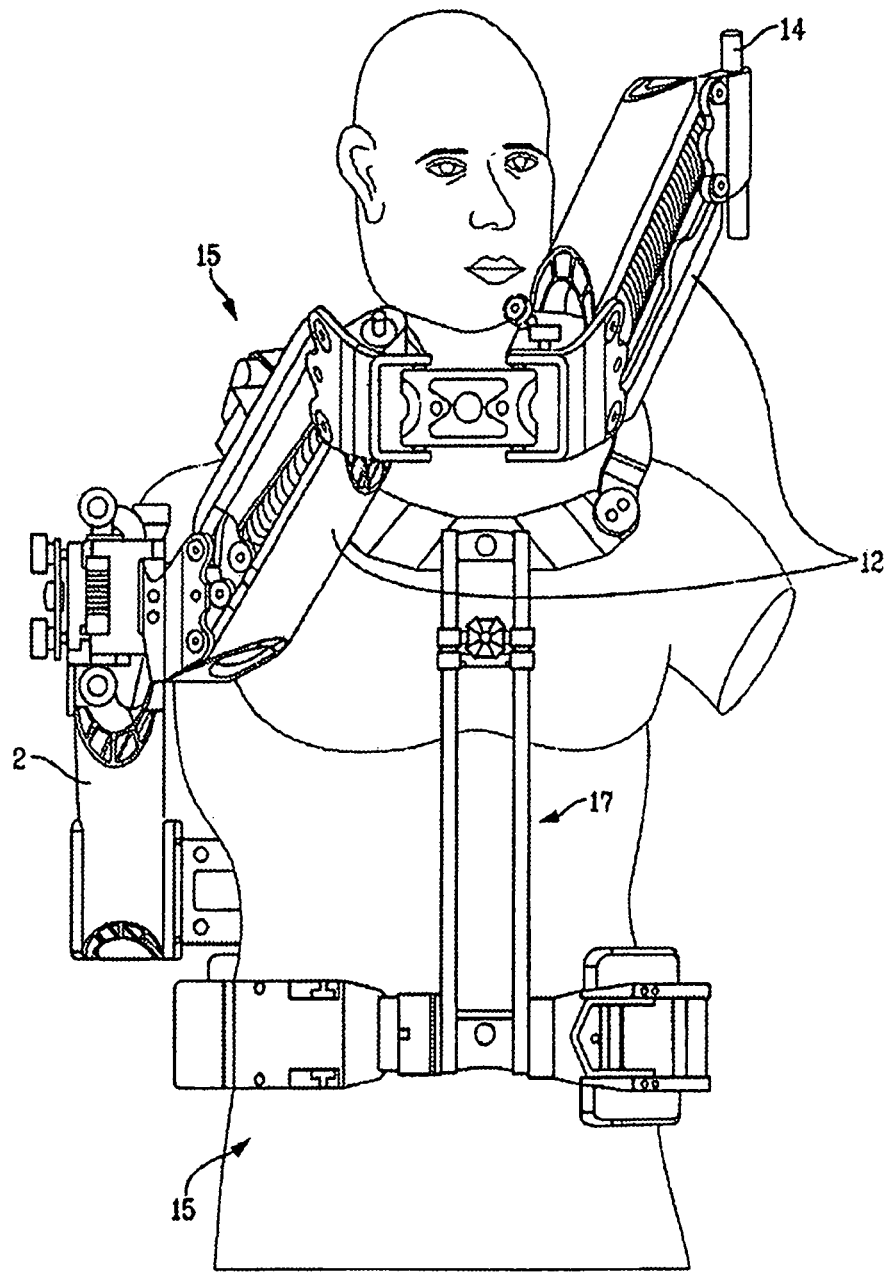

FIGS. 6A-B show two front views of the lifting extension mount 2 with attached two-section equipoising arm 12, illustrating the maximum low (FIG. 6A) and maximum high excursions (FIG. 6B) according to an illustrative embodiment of the invention. Note that the operator shown is not encumbered by having all three lifting sections deployed in front. Additionally in this illustrative embodiment of the invention, his width plus the arm, are not greatly wider than the two-section arm operator of FIG. 2, and so could still maneuver through normal doorways, etc. without difficulty. The vest assembly 15 includes spars 17 extending from the waist section of vest assembly 15 to the shoulder portion.

Figure 7:
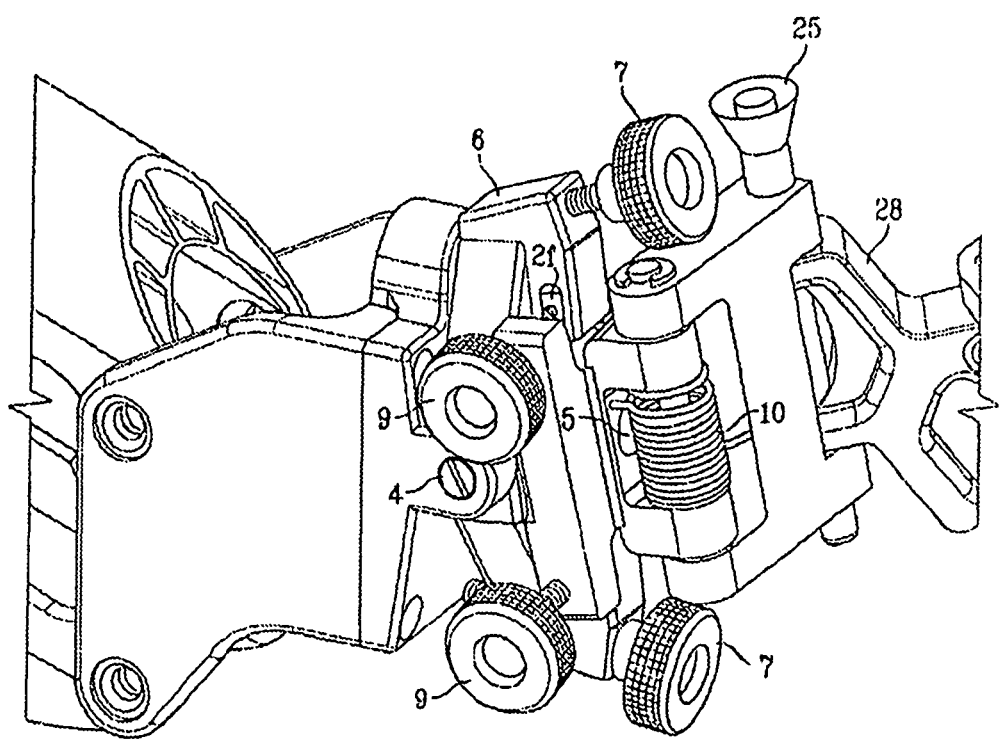
FIG. 7 is a close-up isometric view of an arm-angle adjustment assembly according to an illustrative embodiment of the invention, adjusted to its maximum angular excursion about two orthogonally disposed axes.

FIG. 7 is a close-up isometric view of an arm-angle adjustment assembly 3, adjusted to its maximum angular excursion in both fore/aft and side/side axes, according to an illustrative embodiment of the invention. First rocker block 6 pivots on axles 4 (one not shown) positioned, as illustrated in this figure, leaning back to its furthest extent and locked by first rocker screws 7. Second rocker block (plus arm hinge mount 5) is shown positioned maximally leaning to the left and locked by second rocker screws 9. Note that screws 9 engage rocker screw 'keeper' notches 11 (top one shown). Torsion spring 10 biases the primary arm mounting hinge to the right in this illustration (it can be installed to bias in either direction, per operator preference), and provides a fixed mount for primary arts hinge 28 by means of pin 25.

Figure 8:
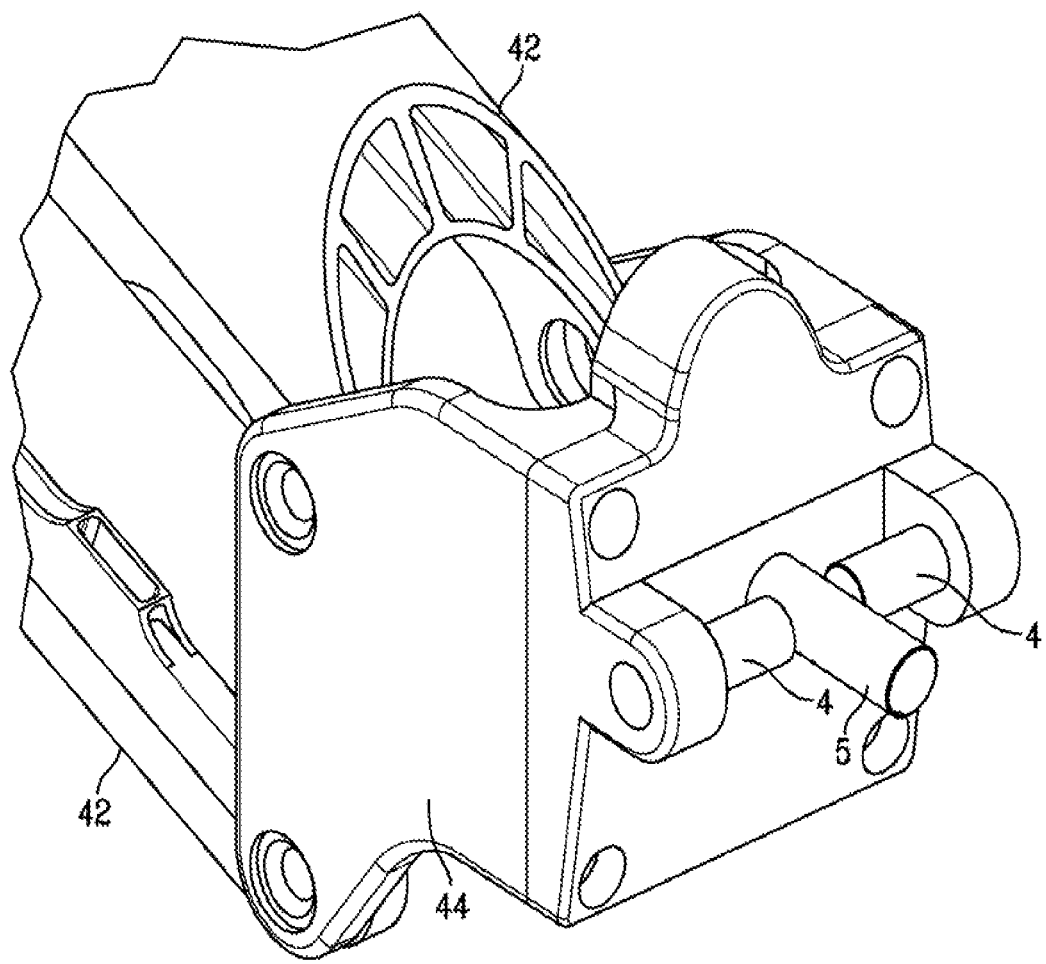
FIG. 8 shows the disassembled first stage and perpendicular axles of the angle adjustment assembly of FIG. 7 according to an illustrative embodiment of the invention.

FIG. 8 shows the disassembled first stage and perpendicular axles of the angle adjustment assembly of FIG. 7 according to an illustrative embodiment of the invention. The first stage of adjuster 3 is shown and its attachment to forward end-block 15c and pivotally-associated parallelogram links 42. The orthogonally converging primary (fore/aft) axle pins 4 and secondary (side/side) axle pin 5 of adjustment assembly 3 of FIG. 7 are also shown. Note that axle 5 is floating in this illustration, as it is fixedly engaged with and thus pivots with, first rocker block 6 (shown in FIG. 7).

Figure 9:
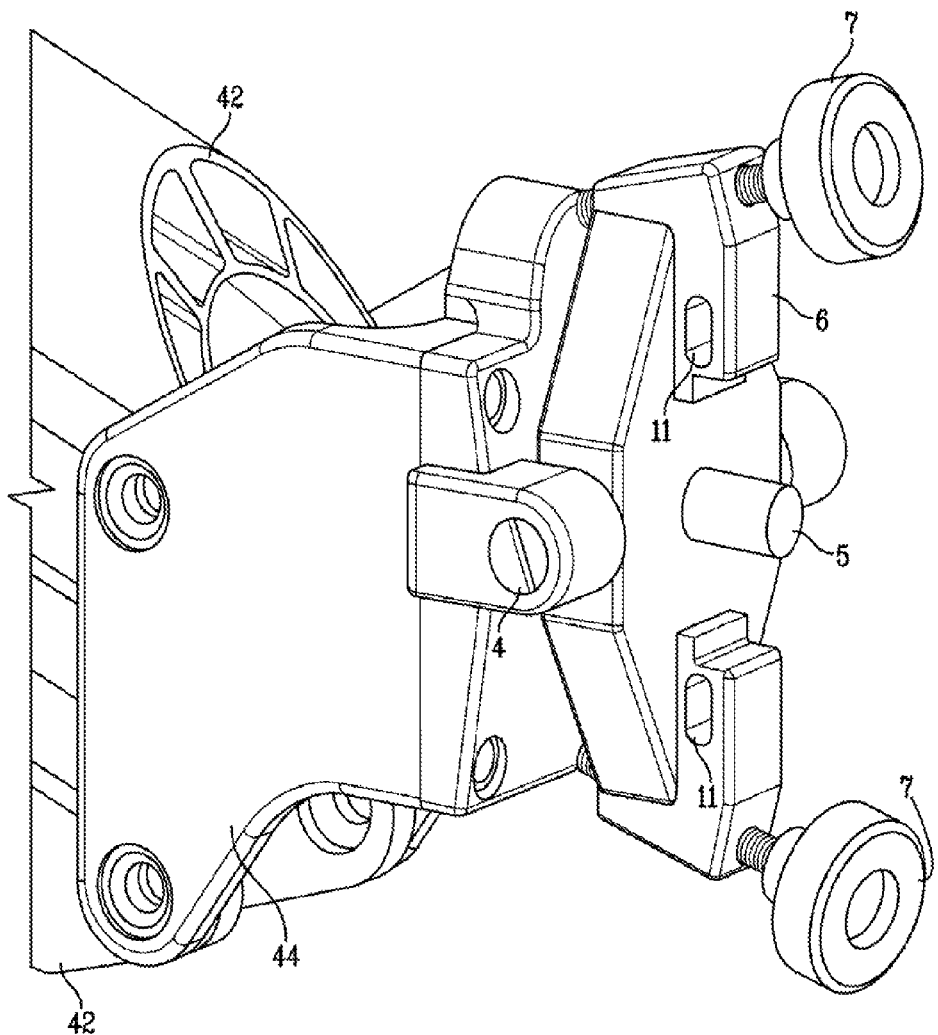
FIG. 9 adds the second stage of the angle adjustment assembly of FIG. 7 according to an illustrative embodiment of the invention.

FIG. 9 depicts the second stage of angle adjustment assembly 3 of FIG. 7, detailing first rocker block 6 and its fixed engagement with secondary axle pin 5, plus first rocker screws 7 and the location of second rocker screw notches 11. Refer back to FIG. 7 to view the first and second stage of angle adjustment assembly 3 assembled.

Figure 10:
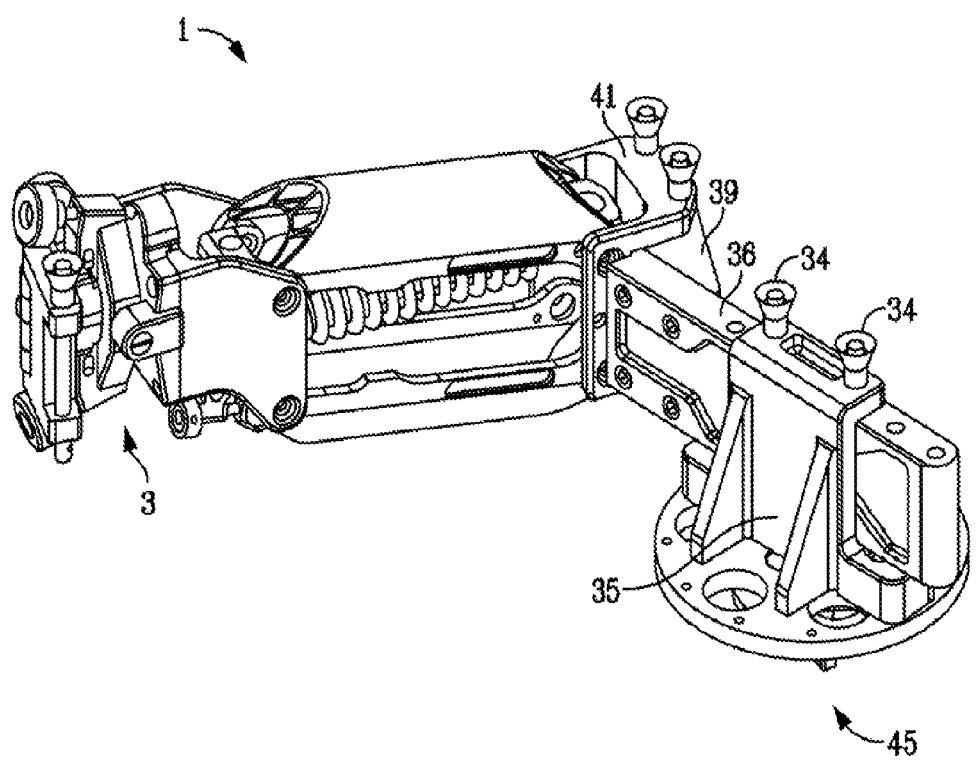
FIG. 10 depicts a prior art apparatus for hard-mounting the lifting extension to equipoising arms and deploying them on fixed or mobile platforms.

FIG. 10 details an illustrative apparatus for mounting a lifting extension mount 1 to fixed or mobile platforms. A conventional mounting adaptor such as 'Mitchell Mount' hard-mount tripod adaptor 45 is rigidly attached to hard-mount clamp 35, which rigidly mourns extension mount-component 36 by means of pins 34. Bridge 36 is rigidly attached to an end-block mount 39 which in turn is mounted to end-block 41, etc. as before, terminating with an angle adjustment assembly 3. The addition of lifting extension mount 1 increases the lifting range of an equipoising arm (such as shown in FIG. 6), and also permits such conventional arms to be operated closer to the center of their range, which may improve their lateral reach and reduce safety issues and potential collisions with the structures (vehicular or fixed) on which they may be mounted. Further, since an arm mounted by means of lifting-mount 1 remains reachably adjustable as to arm-to-vehicle angle, it can usefully be mounted behind the operator to keep the mounting apparatus of FIG. 10 from being in his or her way or posing a safety hazard in the event the operator needs to release a seat belt and jump free of a vehicle to avoid a sudden danger such as over-turning, etc. This illustrative embodiment of the invention would also be useful in an application in which it was employed to hoist and operate a heavy industrial tool. The mounting apparatus would likewise be usefully behind the operator and such tool use benefit from the increased lifting range and lateral reach.

Figure 11:
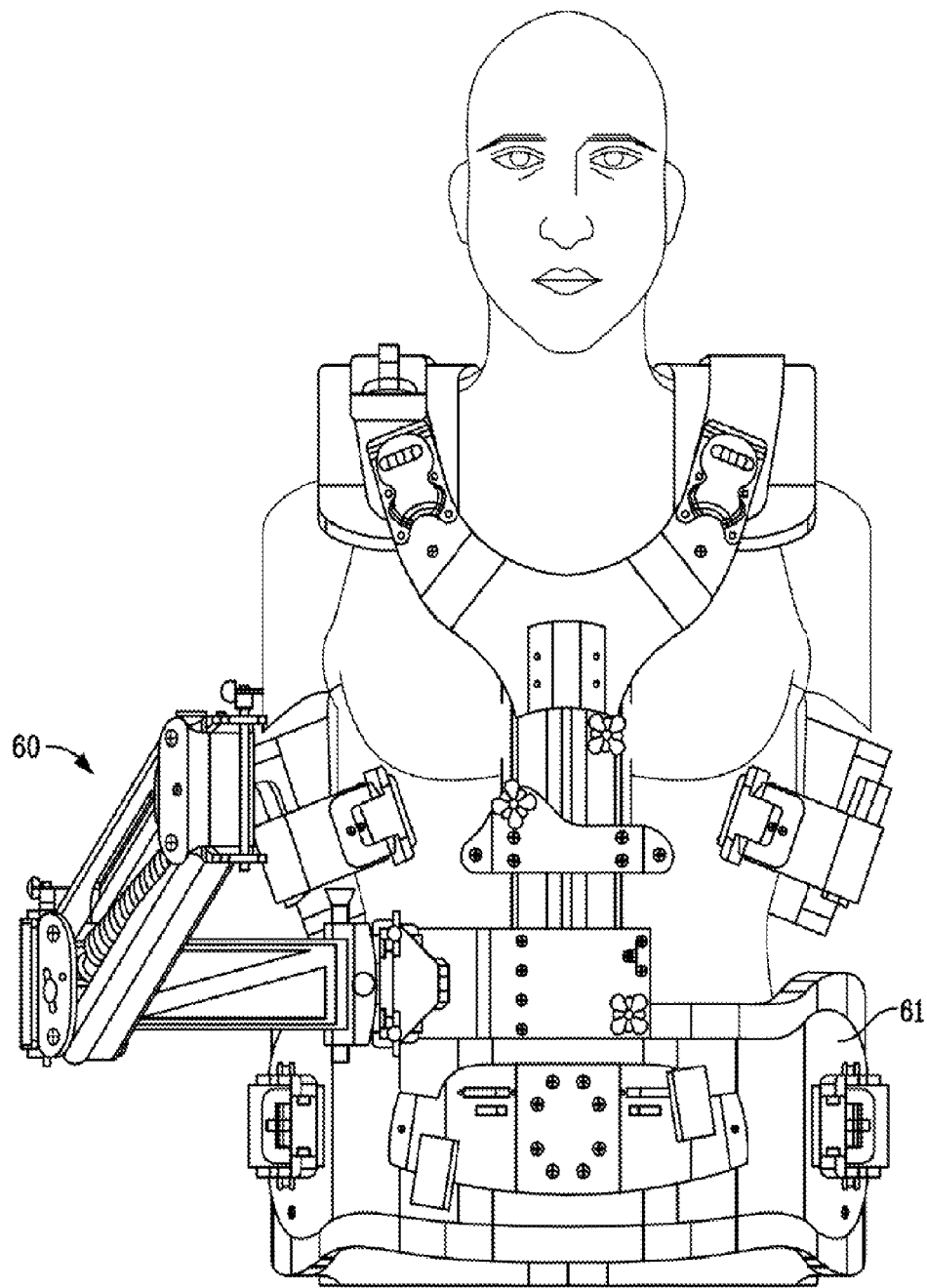
FIG. 11 depicts a lifting extension mount assembly attached to the front portion an vest according to an illustrative embodiment of the invention.
Figure 12:
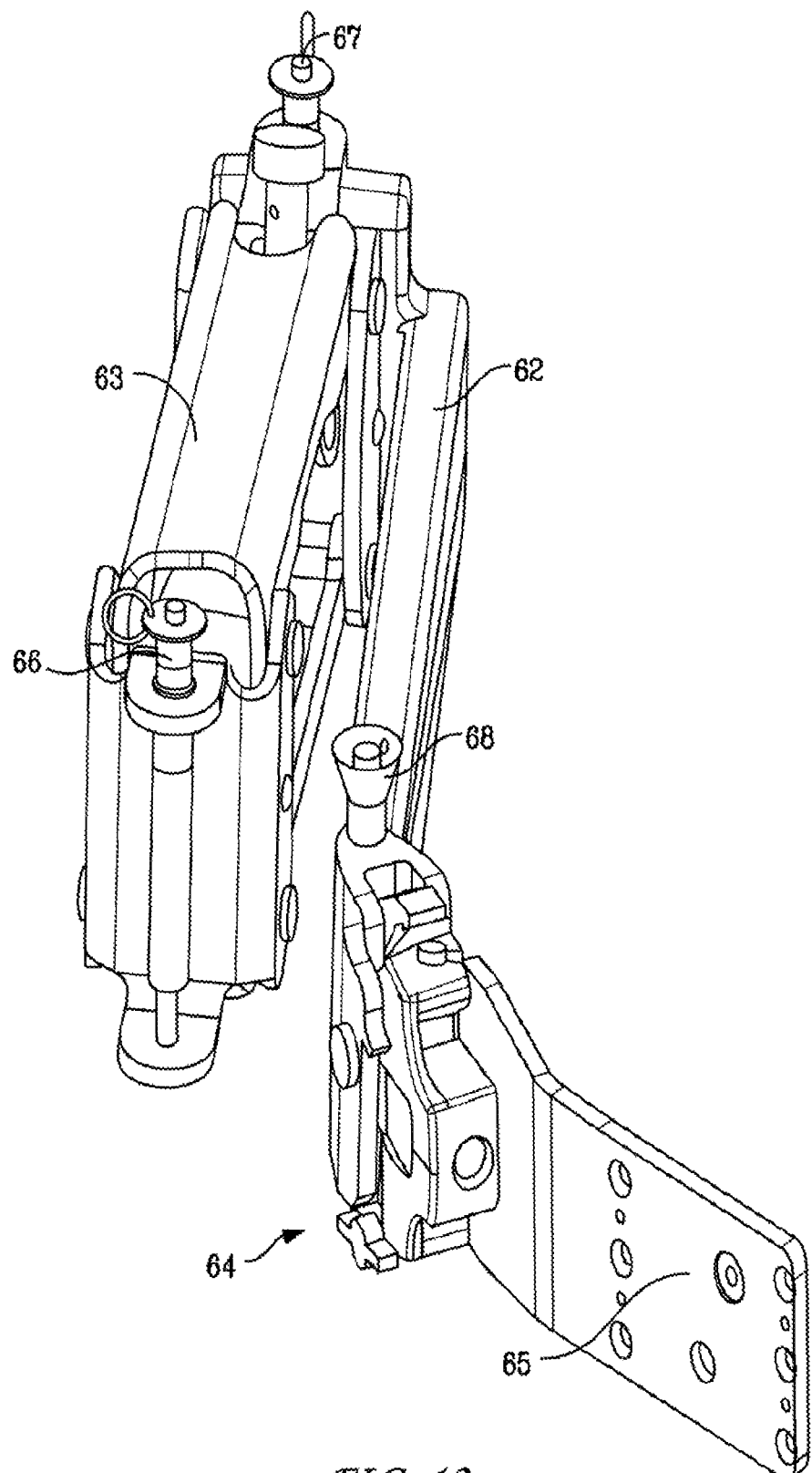
FIG. 12 depicts a "front" view of a lifting extension mount assembly including a plate by which the assembly can be attached for example to the front portion of a vest according to an illustrative embodiment of the invention.
Figure 13:
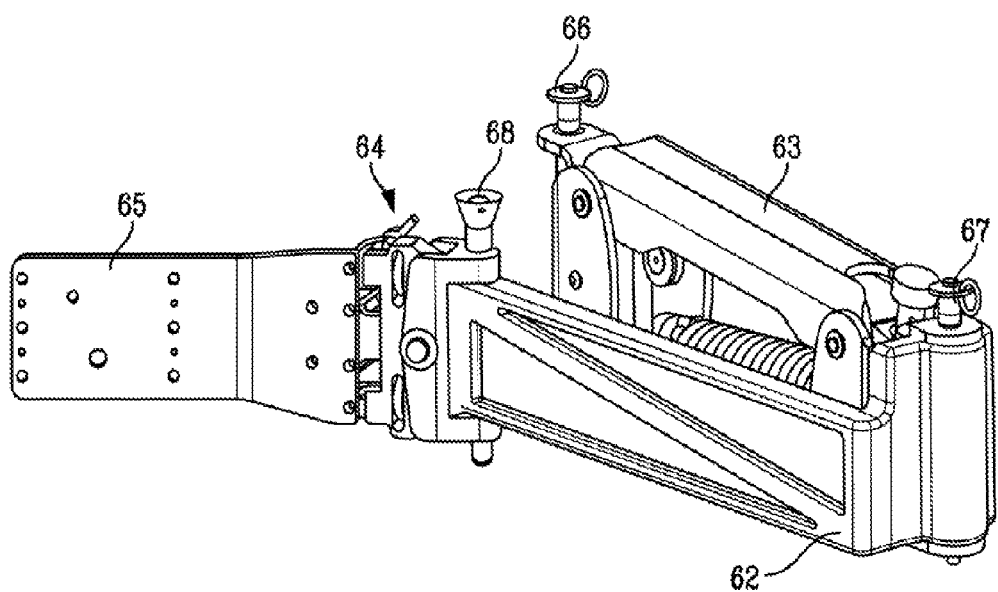
FIG. 13 depicts a "back" view of the lifting extension mount assembly of FIG. 12 according to an illustrative embodiment of the invention.

FIG. 11 depicts a lifting extension mount assembly 60 according to an illustrative embodiment of the invention that is attached to the front of a support vest 61. FIGS. 12 and 13 depict a front view and a back view of the front extension mount, respectively, according to an illustrative embodiment of the invention. A first end of the rigid extension mounting component 62 is attached to an extension mount assembly lifting segment 63, and a second end of rigid extension mounting component 62 is attached to an arm-angle adjuster assembly 64. Arm angle adjustment assembly 64 is also attached to a support vest mounting plate 65.

Figure 14:
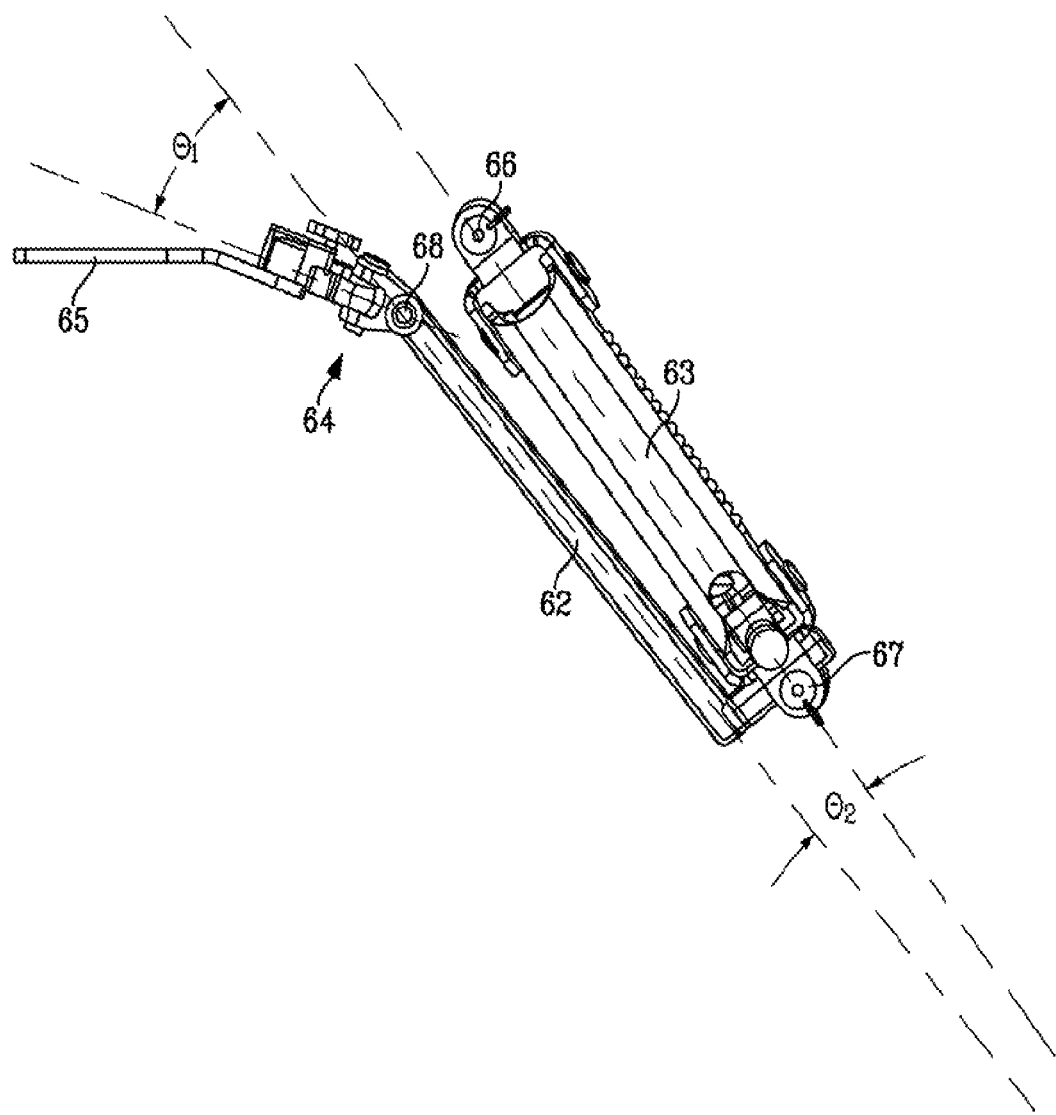
FIG. 14 depicts a top view of the lifting extension mount assembly of FIG. 12 according to an illustrative embodiment of the invention.

FIG. 14 depicts a top view of the extension mount depicted in FIGS. 12 and 13. Extension mounting component 62 is at an angle of $\theta_1$ with respect to support vest mounting plate. Extension mount assembly lifting segment 63 is at an angle $\theta_2$ with respect to extension mounting component 62. Angles $\theta_1$ and $\theta_2$ are fixed, i.e. extension mounting component 62 docs not swivel with respect to support vest mounting plate 65 at pin 68, and extension mount assembly lifting segment 63 does not swivel with respect to extension mounting component 62 at pin 67. A lifting arm such as part 3 shown in FIG. 1 which attaches at pin 66, however, would swivel with respect to extension mount assembly lifting segment 63.

The relationship between extension mounting component 62 and extension mount assembly lifting segment 63, however, is not entirely fixed in that extension mount assembly lifting segment 63 can move in what typically will be a substantially vertical plane, while the position of extension mounting component 62 is substantially fixed with respect to the support vest to which it is attached.

Figure 15:
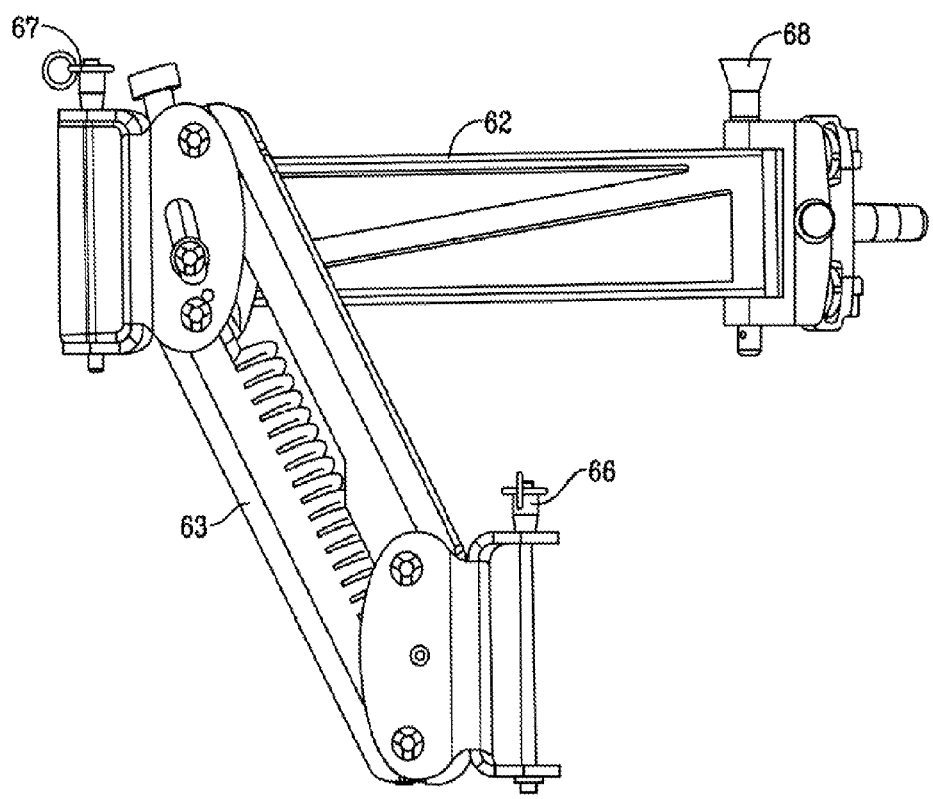
FIG. 15 depicts a lifting extension mount assembly with the lifting segment boomed downward according to an illustrative embodiment of the invention.
Figure 16:
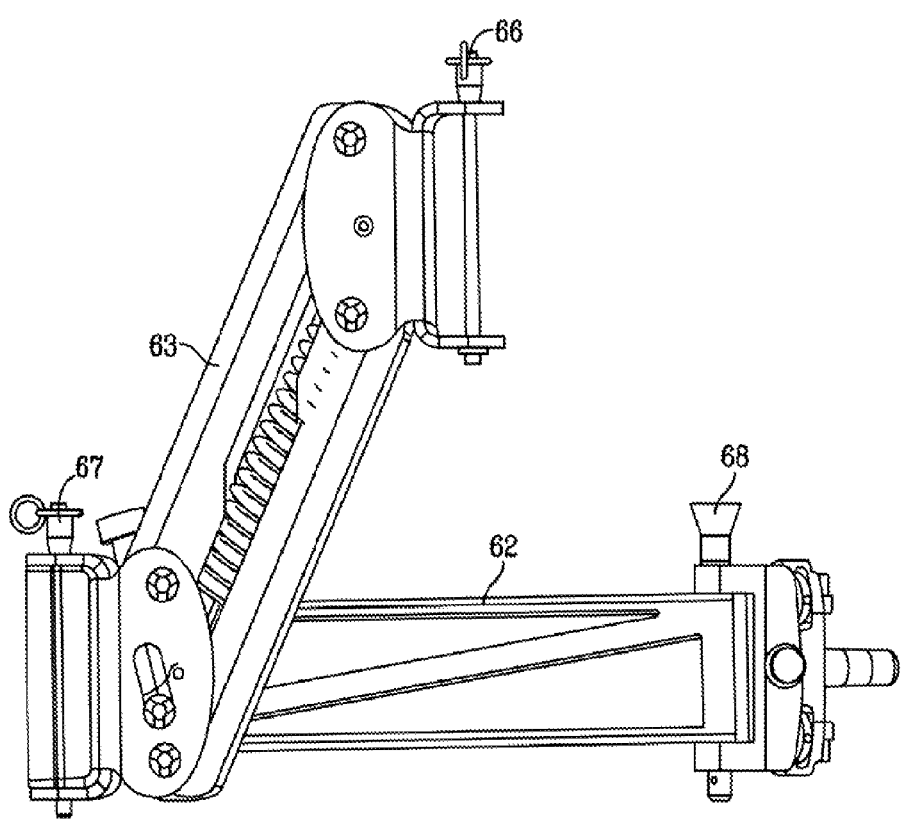
FIG. 16 depicts a lifting extension mount assembly with the lifting segment boomed upward according to an illustrative embodiment of the invention.

FIG. 15 shows a lifting extension mount assembly wherein lifting segment 63 is pivoted downward with respect to extension mounting component 62. FIG. 16 shows an extension mount assembly wherein extension mount assembly lifting segment 63 is pivoted upward with respect to extension mounting component 62.

The relative angle between the extender and the operator is preferably adjustable by an angle adjustment assembly disposed at the attachment of the extension mount component when the extension mount assembly is mounted in front of the operator so as to be reachable by the operator. The adjustment made by the angle adjustment assembly maintain the parallelogram sides of the lifting segments in a substantially vertical position or as otherwise selected, in relation to an operator's desired posture or if attached to an object other than one worn by the operator, in relation to the position of that object.

Figure 17:
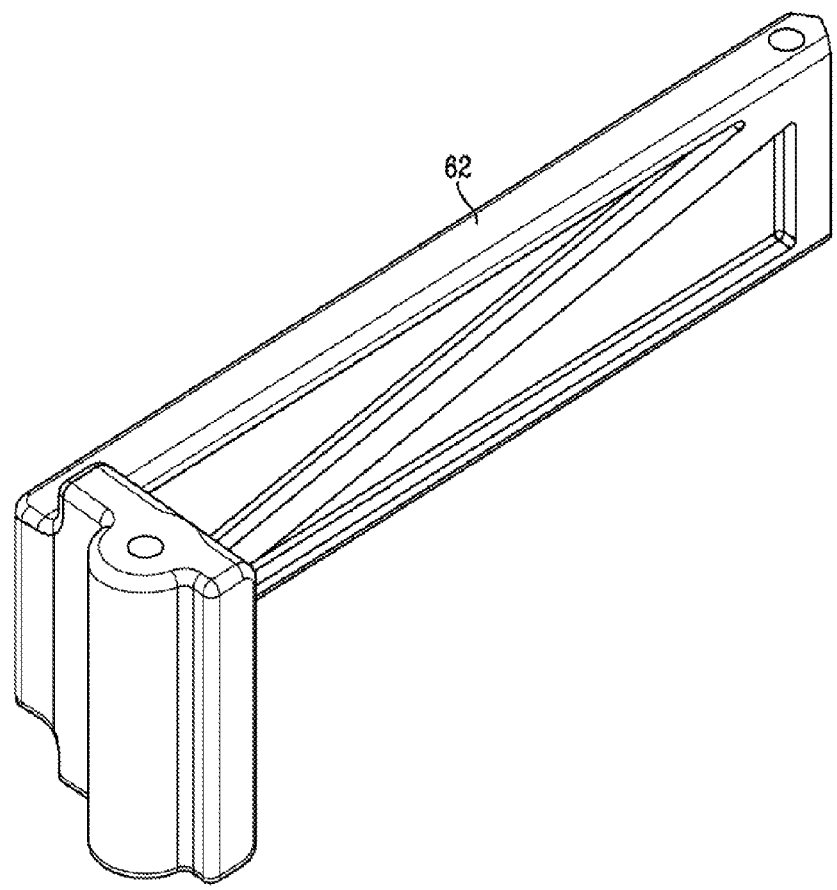
FIG. 17 depicts an extension mount component configured and disposed for right side use if attached to an object in from of an operator according to an illustrative embodiment of the invention.
Figure 18:
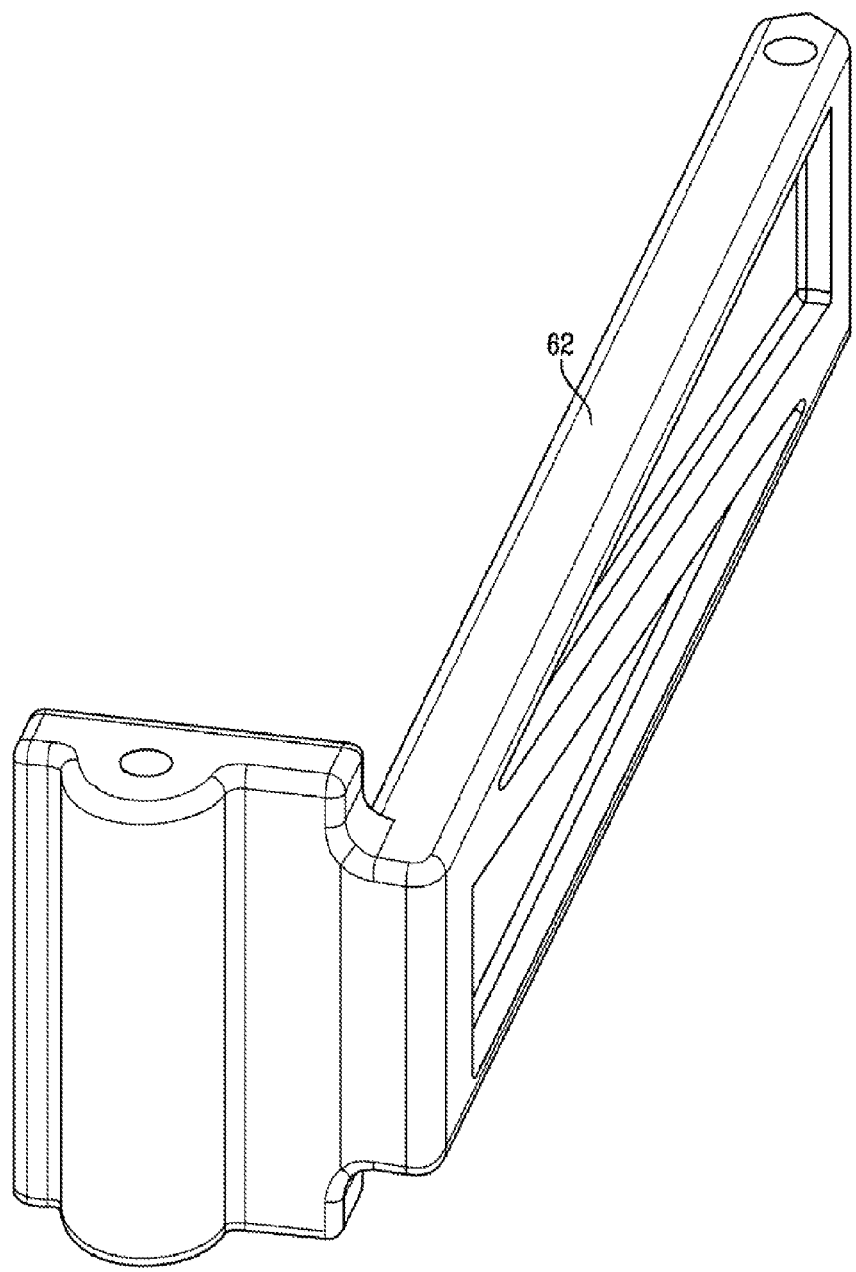
FIG. 18 depicts an extension mount component configured and disposed for left side use if attached to an object in from of an operator according to an illustrative embodiment of the invention.

The extension mount assembly can be designed to be used on the right or left side of the user. FIG. 11 shows a user with the extension mounting assembly on his right side. By inverting the extension mounting component between the positions as shown in FIGS. 17 and 18, the extension mounting assembly can be disposed on one or the other side of the user. This is true whether the assembly is a front-mounted or rear-mounted assembly.

Figure 19:
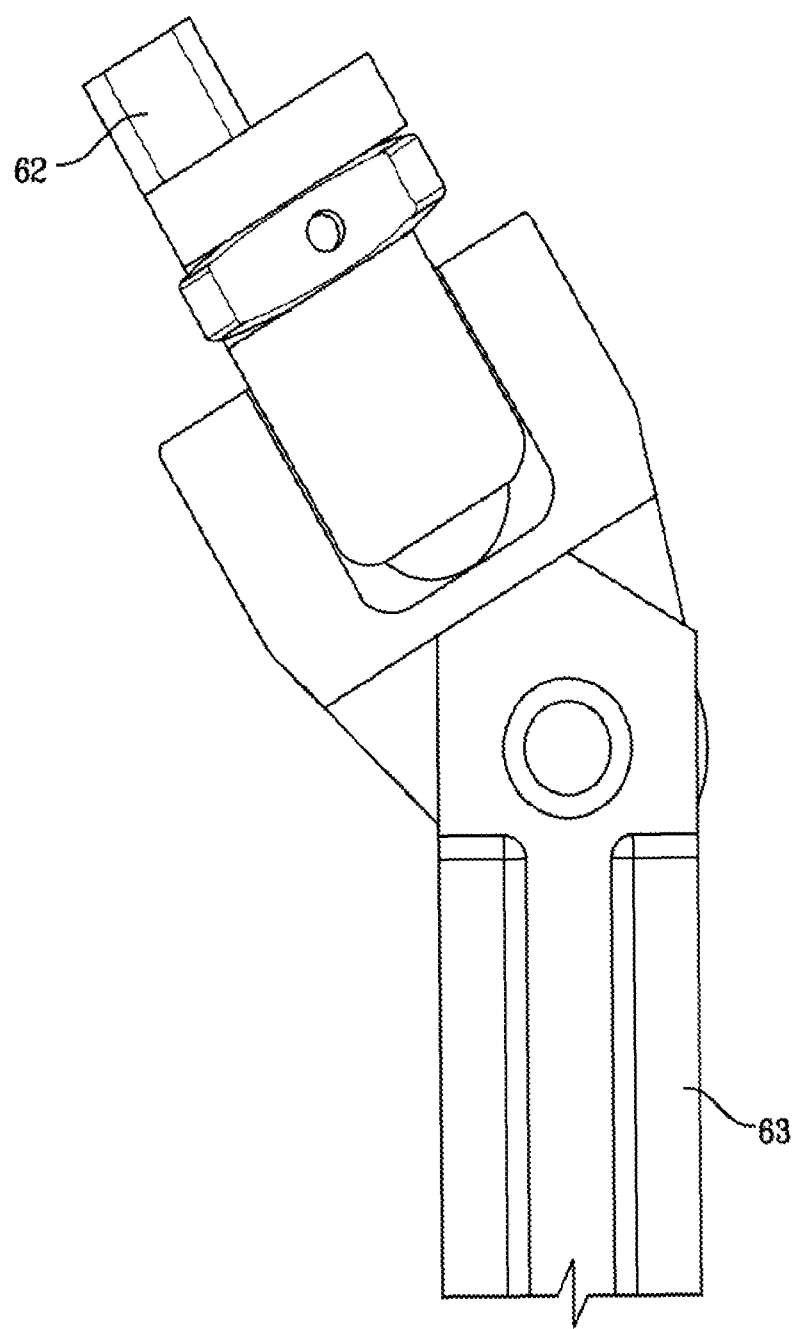
FIG. 19 depicts a cross section of a lifting segment of a lifting extension mount assembly according to an illustrative embodiment of the invention.

FIG. 19 depicts a cross section of a portion of a lifting extension mount assembly showing a lifting segment 63 attached to an extension mount component 62 according to an illustrative embodiment of the invention.

It is noted that the extension mounting apparatus, can be attached to objects other than vests, such as those that are relatively stationary with respect to the user, like a chair. It is also noted that the term "plate" as used herein is not limited to a particular shape or dimension such as flat.

While the invention has been described by illustrative embodiments, additional advantages and modifications will occur to those skilled in the art. Therefore, the invention in its broader aspects is not limited to specific details shown and described herein. Modifications, for example to the nature of the connections, materials and application, may be made without departing from the spirit and scope of the invention. Accordingly, it is intended that the invention not be limited to the illustrative embodiments, but be interpreted within the full spirit and scope of the embodiments described herein, the claims, and their equivalents.

Various embodiments of the invention have been described, each having a different combination of elements. The invention is not limited to the specific embodiments disclosed, and may include different combinations of the elements disclosed or omission of some elements and the equivalents of such structures.

The invention claimed is:

1. A lifting extension mount assembly comprising:
   an extension mount component having a proximate end and a distal end and configured to be rigidly fixed to an object at its proximate end;
   a lifting segment having a proximate end and a distal end;
   the lifting segment attached at its proximate end to the distal end of the extension mount component at an extension mount component attachment point and pivotable with respect to the extension mount component at the attachment point in a vertical plane only;
   the lifting extension mount assembly attachable to a two-segment lifting arm;
   an angle-adjustment assembly to maintain substantially vertical lifting segment proximate and distal parallelogram sides in relation to an operator's preferred posture;
   wherein the arm-angle adjustment assembly comprises:
   a first rocker block pivotable about a first axis;
   a second rocker block pivotable about a second axis perpendicular to the first axis;
   first rocker block screws disposed through the first rocker block and by which the first rocker block can be adjusted about the first axis; and
   second rocker block screws disposed through the second rocker block and by which the second rocker block can be adjusted about the second axis.

2. The lifting extension mount assembly of claim 1 further comprising the two segment lifting arm.

3. The lifting extension mount assembly of claim 1 wherein the extension mount component is adjustable in a substantially horizontal plane.

4. The lifting extension mount assembly of claim 1 wherein the extension mount assembly is configured to be attached to aback portion of a vest.

5. The lifting extension mount assembly of claim 1 wherein the angle-adjustment assembly is disposed at the proximate end of the extension mount component.

6. The lifting extension mount assembly of claim 1 adjustable to accommodate right-side or left-side operation by inverting the extension mount components.

7. The lifting extension mount of assembly claim 1 comprising a torsion spring disposed between the arm-angle adjustment assembly and a lifting segment of the two-segment lifting arm to bias the two segment lifting arm about an axis disposed substantially perpendicular to the lifting axis of the two-segment lifting arm.

8. The lifting extension mount assembly of claim 1 further comprising screw keeper notches in the first rocker block, wherein the second rocker block screws engagable with the screw keeper notches.

9. A method of supporting a payload comprising:
providing a lifting extension mount assembly according to claim 1;
attaching the lifting extension mount assembly to an object at one end and to an equipoising arm at the other end.

10. The lifting extension mount assembly of claim 1 wherein the extension mount assembly is configured to be attached to an object behind an operator.

11. The lifting extension mount assembly of claim 4 wherein:
the angle-adjustment assembly is disposed between the lifting segment and the extension mount component.

12. The lifting extension mount assembly of claim 1 wherein the extension mount assembly is configured to be attached to an object in front of an operator.

13. The lifting extension mount assembly of claim 12 wherein the extension mount assembly is configured to be attached to a front portion of a vest.

* * * * *